UNITED STATES PATENT OFFICE.

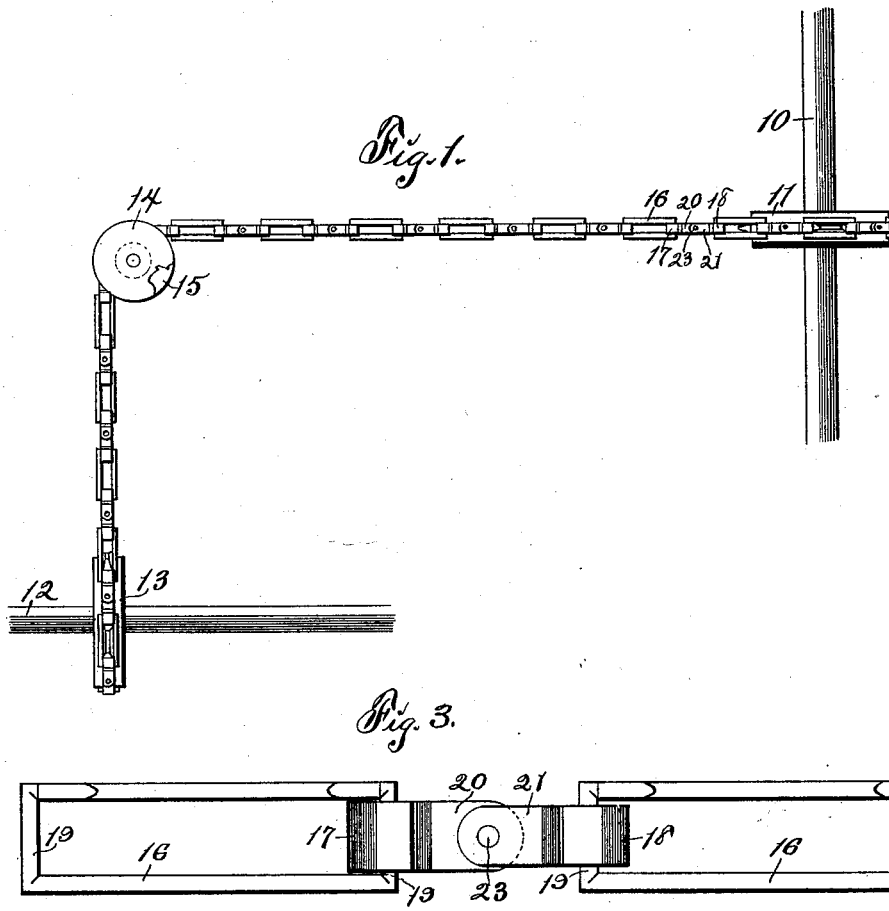

JOHN McCORMICK, OF SPENCER, IOWA.

SPROCKET-CHAIN.

SPECIFICATION forming part of Letters Patent No. 594,416, dated November 30, 1897.

Application filed March 12, 1897. Serial No. 627,143. (No model.)

*To all whom it may concern:*

Be it known that I, JOHN McCORMICK, a citizen of the United States of America, residing at Spencer, in the county of Clay and State of Iowa, have invented a new and useful Sprocket-Chain, of which the following is a specification.

The object of this invention is to provide improved means for transmitting power and motion from a drive-shaft to a follower-shaft, the axes of said shafts being at right angles to each other.

This invention consists in the construction of a chain with links universally jointed together, and said chain may be employed with guide-sheaves to direct the travel thereof, if desired.

This invention consists, further, in the construction, arrangement, and combination of elements hereinafter set forth, pointed out in my claim, and illustrated by the accompanying drawings, in which—

Figure 1 is a plan illustrating the construction, use, and operation of my chain. Fig. 2 is a detailed elevation of a section of my chain, and Fig. 3 is a plan of the device shown in Fig. 2.

In the construction of the device as shown the numeral 10 designates a power or drive shaft to which is rigidly attached a sprocket-wheel 11. A counter-shaft or follower-shaft 12 is arranged with its axis at right angles to the axis of the shaft 10, and a sprocket-wheel 13 is mounted rigidly thereon. A guide-sheave 14 is mounted for revolution on a vertical axis (or a horizontal axis if the axes of the shafts 10 12 are vertical) at a point in a plane common to the peripheries of the sprocket-wheels 11 13 and where two lines traversing the sprocket-wheels at right angles to the shafts would intersect each other, and another guide-sheave 15 is mounted for revolution on the same axis as the guide-sheave 14 and in a plane common to points on the peripheries of the sprocket-wheels diametrically opposite to the plane in which the guide-sheave 14 is mounted. I construct an endless chain to run around the sprocket-wheels and guide-sheaves, and the construction of my chain is as follows:

Links 16, each made of a single bar of metal in rectangular form and with square corners, are mounted with their end bars engaging hooks 17 18. One of the side bars of each link is formed thin at its ends adjacent to the end bars 19 of the link. The hook 17 is formed with a stem 20, which stem is flattened and relatively thin. The hook 18 is formed with ears 21 22 separated to admit the flattened stem 20 between said ears. A pivotal pin 23 is mounted axially in and traverses the ears 21 22 and the stem 20, and said pin is riveted at its ends outside of the ears 21 22. The openings of the hooks 17 18 are of less diameter than the diameter of the end bars 19 of the links 16, and said links are connected with the hooks by movement of the links laterally through the openings of the hooks, the thinner portions 24 of the bars of the links readily traversing said openings. The hook 18 is of less width than the hook 17.

The hinge connection between the end bars of the links and the hooks 17 18 provides flexibility in the chain to permit the same to run over the sprocket-wheels 11 13, and the pivotal connection between the hooks 17 and 18 provides a flexibility of the chain at right angles to the flexibility provided by the hinge connection aforesaid, whereby the chain is permitted to bend laterally in order to run around the guide-sheaves 14 15.

I claim as my invention—

In a sprocket-chain the combination of a hook 17, a stem 20 on said hook, which stem is relatively thinner than the hook and transversely apertured, a hook 18, ears 21, 22 on said hook and transversely apertured, which ears 21, 22 embrace the stem 20, a pivotal pin 23 mounted in the apertures of the ears and stem, in combination with a link mounted in each hook, the openings of the hooks being of less width than the diameters of the ends of the links, as set forth.

JOHN McCORMICK.

Witnesses:
E. H. IMLAY,
F. S. ADAMS.